Jan. 5, 1937.  M. W. BARTMESS  2,066,904
THERMAL PROTECTIVE SYSTEM
Filed Dec. 12, 1934   2 Sheets-Sheet 1
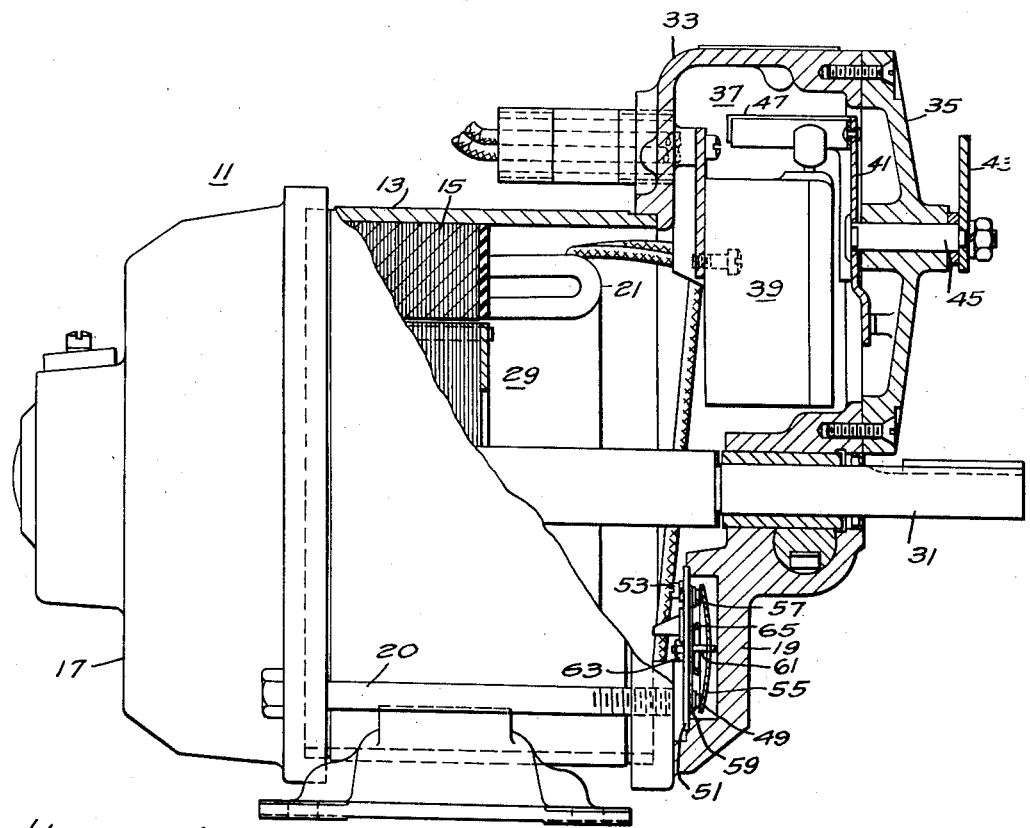
WITNESSES:
INVENTOR
Meigs W. Bartmess.
BY
ATTORNEY

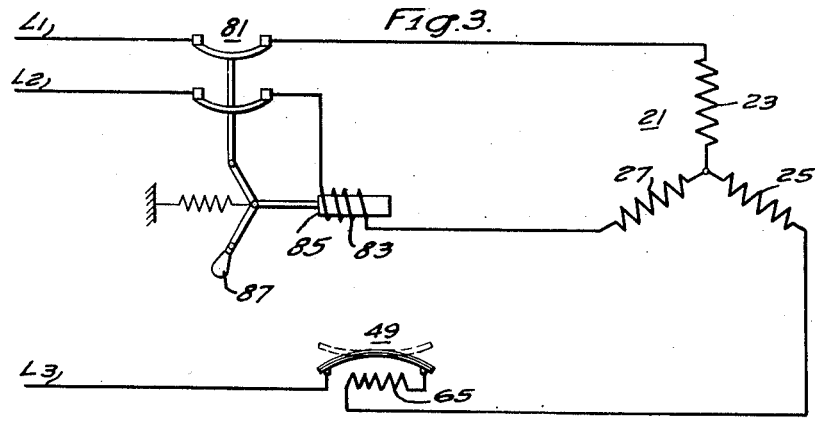
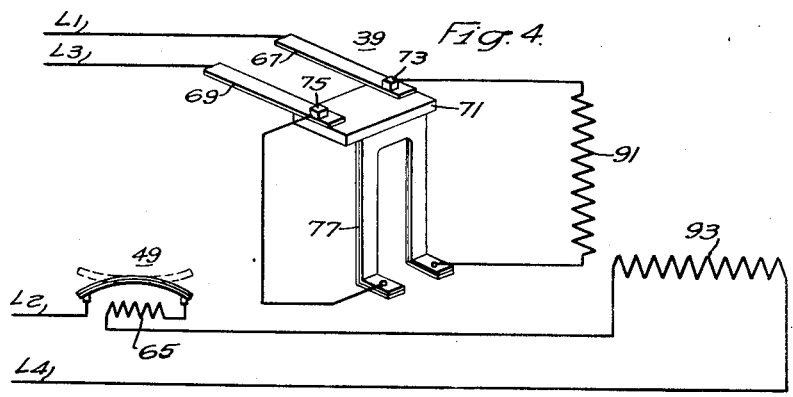
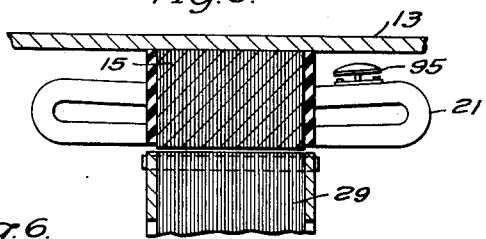
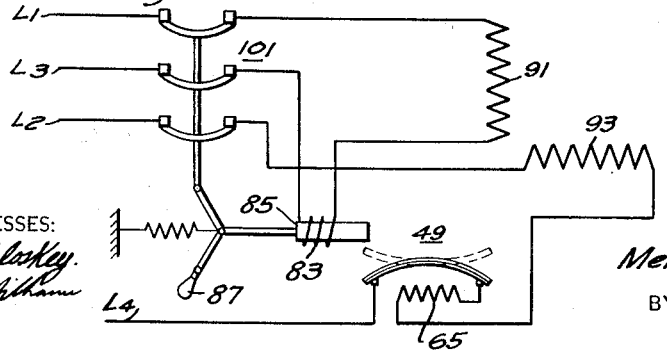

Patented Jan. 5, 1937

2,066,904

UNITED STATES PATENT OFFICE 2,066,904

THERMAL PROTECTIVE SYSTEM

Meigs W. Bartmess, Springfield, Mass., assignor to Westinghouse Electric & Manufacturing Company, East Pittsburgh, Pa., a corporation of Pennsylvania Application December 12, 1934, Serial No. 757,141

7 Claims. (Cl. 175—294)

My invention relates to protective systems and particularly to overload protective systems for polyphase electric motors.

An object of my invention is to provide a relatively simple method for protecting a polyphase alternating-current motor against excessive temperature rise.

Another object of my invention is to provide a thermal protective system for a polyphase alternating-current motor, embodying a plurality of separate control elements.

Another object of my invention is to provide a thermal protective system for a polyphase alternating-current motor that shall be actuated initially in accordance with the temperature of the motor and then in accordance with the effect of an extra overload current in a certain phase circuit of the motor.

Other objects of my invention will either be specifically pointed out hereinafter or will be evident from a description of a method and system, embodying my invention, now preferred by me.

In practicing my invention, I provide, in combination with a polyphase alternating-current electric motor, a thermal relay mounted in direct heat-receiving relation with either the frame or the stator winding and also a current-controlled switch which may be operatively mounted on the motor or may be remotely located therefrom.

In the drawings:

Figure 1 is a view, mainly in front elevation but with parts broken away, of a polyphase electric motor having associated therewith the control switches used in my invention;

Fig. 2 is a schematic diagram of connections of one system of electric circuits used in practicing my improved method;

Fig. 3 is a diagram of connections showing a different form of current-controlled circuit-interrupting device;

Fig. 4 is a diagram of connections similar to Fig. 2 but showing the same control elements as applied to a two-phase motor instead of a three-phase motor;

Fig. 5 is a fragmentary view in longitudinal section of a polyphase motor showing a different support for one of the circuit-interrupting devices; and Fig. 6 is a diagram of connections similar to Fig. 3 but applied to a two-phase motor.

Referring first to Fig. 1 of the drawings, I have there illustrated, more or less generally only, an electric motor 11 having a housing 13, a set of stator laminations 15 secured therein and provided also with two bearing brackets or end bells 17 and 19 held against the housing by bolts 20. As the method embodying my invention has first been worked out and applied to an explosion-resisting motor, I have illustrated generally a motor of this type, but my invention is not limited to such motors but may be used on any polyphase alternating-current motor. The motor includes also a polyphase energizing stator winding designated by the numeral 21 in Fig. 1 of the drawings and shown as comprising windings 23, 25 and 27 (see Fig. 2), which for illustrative purposes are shown as being connected in star.

The motor includes further a rotor 29 which may be of the squirrel-cage type and include a rotor shaft 31.

Bearing bracket 19 is provided with an extension 33 thereon having a cover 35 associated therewith and adapted to be bolted thereagainst to provide a switch chamber 37 having located therein a circuit-interrupting device 39, which is manually closable as by a lever arm 41 and which is automatically actuable to open-circuit position, as will be hereinafter more fully set forth. In order to actuate arm 41 to close the circuit-breaker, I provide an external actuating arm 43 mounted on a stud 45 extending through the cover 35 and provided with any suitable or desired type of arm 47 to engage switch arm 41 and actuate it to close circuit-breaker 39 when desired.

A thermal relay 49 is mounted in direct heat-receiving relation in the housing 13 and more particularly in a recess in the bearing bracket 19 and includes a base 51 suitably tightly clamped against the inner surface of bearing bracket 19 as by a plurality of short machine screws 53.

Device 49 includes also a snap-acting bimetallic disk 55 which may be of the kind disclosed and claimed in patent No. 1,448,240 to J. A. Spencer. A plurality of contact members 57 are insulatedly mounted on and supported by the disk 55 adjacent to its periphery and cooperate with substantially fixed contact members 59 supported in an insulated manner on the base 51. The design and construction of device 49 is such as to provide a plurality of cooperating contact members which are disengaged from each other when the disk 55 is heated to a certain temperature, when it will move with a snap action from the position shown in Fig. 1 of the drawings to an oppositely dished position (shown by the broken lines in Fig. 2) whereby disengagement of the normally engaged contact members is effected to thereby interrupt an energizing circuit in which the relay is electrically connected.

The disk 55 is supported on a stud 61 which has screw-threaded engagement with base 51 and may be located in an adjusted position by a locking nut 63, all in a manner now well known in the art. Device 49 includes also a small heating element 65 which is so connected with certain of the fixed contact members 59 as to be traversed by the same current as traverses the circuit in which the thermal switch 49 is connected and which it controls.

Referring now to Fig. 2 of the drawings, I have there illustrated schematically the circuit connections for energizing the three-phase windings 23, 25 and 27 of a star-connected polyphase motor-energizing winding (the rotor having been omitted for the sake of clearness). The supply of electric energy, at a suitable voltage, is through three supply-circuit conductors L₁, L₂ and L₃ and I have illustrated schematically one form which switch 39 may take. Thus it may comprise two pivotally mounted switch blades 67 and 69 whose movable ends are secured respectively to a plate 71 of electric-insulating material, the movable ends of arms 67 and 69 cooperating with substantially fixed contact members 73 and 75. The switch arms may be moved manually by means (not shown in the drawings) to the closed position where they are held by a bimetallic latch 77 which is connected in circuit with one of the blades as, for instance, blade 69, to be traversed by the same current as is carried by this switch blade. It may here be stated that the schematic showing of device 39 in Fig. 2 of the drawings is very general only and that I may use, for instance, a device of the kind disclosed and claimed in Patent No. 1,726,233 to H. K. Krantz and assigned to the same assignee as is the present application.

Let is be assumed that the motor 11 has been operating at either normal load or at variable loads which have not been excessively large or beyond the normal rating of the motor, but that the load increases to a relatively large overload value whereby a temperature rise of the motor is caused, and let it be assumed further that this temperature rise reaches a value which would in a short time become dangerous to the insulating material used in the motor. I prefer to make the current-carrying capacity of thermal switch 49 slightly less than that of switch 39, although this is not an essential element of my invention. If the normal capacity of switch 49 is slightly less or, in other words, if it is set to interrupt its circuit at a temperature slightly less than that at which switch 39 will operate and if this temperature is reached in switch 49, it will open, the disc moving to the position shown by the broken lines. The energizing circuit from supply circuit conducor L₃ is thereby interrupted and the motor 11 will continue to operate as a single-phase motor with, of course, greatly increased current traversing the two windings 23 and 27 and supplied from conductors L₁ and L₂. The effect of the current traversing the bimetal member 77 of substantially U-shape, is such that its free end will move outwardly away from under the plate 71 so that the movable parts of the switch will be permitted to move to open position whereby the supply of energy to the two-phase circuits of the motor will also be interrupted. After both switches have operated, the motor is entirely deenergized and is also completely disconnected from the energizing circuit. While thermal switch 49 will reclose after its temperature and that of the motor have decreased, this will not be sufficient to restart the motor, since connection is thereby made to only one terminal of one of the phase windings. In order to restart the motor, it is necessary to effect reclosure of switch 39, as by means of the actuating arm 43.

I wish to here point out that there exists a difference in the operation of switch 49 and of switch 39, namely, that the operation of switch 49 is by thermal effect alone, while the operation of switch 39 may be considered as being primarily caused by current action, that is, the current traversing bimetal element 77 causes it to operate to effect or permit opening of the switch.

Referring now to Fig. 3 of the drawings, I have there illustrated a modified form of system embodying my invention and shown as being applied to the same motor as was hereinbefore described in connection with Figs. 1 and 2 of the drawings. Instead of using a circuit-interrupting device 39 depending for its operation upon the heating effects of a current, I use an overload circuit breaker actuated solely and directly in accordance with an excess current. I have indicated a circuit-interrupter 81 which may have cooperating fixed and movable contact members to control two separate circuits. It may further include an overload coil 83 cooperating with a movable core 85 associated with the other parts of circuit-breaker 81, so that upon the passage of an overload current of a predetermined value through coil 83, it will operate to move the circuit-breaker to open position, where it will remain until manually reclosed by an actuating handle 87. While there will be some time lag in the thermal electric device 39, shown in Figs. 1 and 2 of the drawings, there will be substantially no delay in the operation of device 81 since it depends upon the magnetic effect of an excess current. The single pole thermal switch 49 hereinbefore described is used also in this circuit. The operation of the system shown in Fig. 3 is substantially the same as that described hereinbefore in connection with Fig. 2 of the drawings. It may be noted that the circuit-breaker 81 may be located away from the motor, as, for instance, on a switchboard or a control panel, if desired.

Referring now to Fig. 4 of the drawings, I have there illustrated the application of my method of limiting the temperature rise of a motor as applied to a two-phase alternating-current motor having phase windings 91 and 93. A single pole thermal switch 49 may be connected in circuit with phase winding 93, which may be energized from supply circuit conductors L₃ and L₄ of the usual two-phase supply circuit. The parts of thermal switch 39 may be the same as to design as that shown and described in Fig. 2 of the drawings so that no further description thereof is believed to be necessary.

If an overload occurs on the motor comprising the energizing windings 91 and 93, the thermal switch 49 will operate to interrupt its circuit, whereby the motor will be caused to operate as a single-phase motor energized from conductors L₁ and L₃. The resulting temperature rise in bimetal latch 77 will cause it to move in a manner well known in the art to the right to permit opening of the circuits controlled thereby, so that the energization of phase winding 91 is completely interrupted. As soon as the thermal switch 49 has cooled sufficiently, it will reclose to energize phase winding 93, which will be traversed by a relatively large current and will cause a relatively rapid rise in the temperature of the motor, whereby the switch 49 is caused to reopen, which sequence of operations will continue until an operator investigates the reason for the shutdown of the motor and fully deenergizes it.

If it is desired to ensure that the two-phase electric motor will be entirely deenergized, I may use the system illustrated in Fig. 6 of the drawings. I make use of a three-pole circuit-breaker 101 which is, in general, of the same construction and which embodies the same principles of operation as the breaker 81, except that it embodies three sets of cooperating contact members, which are connected in the leads L₁, L₂ and L₃. The thermal switch 49 is connected in lead L₄. It will be noted that the actuating coil 83 is connected in lead L₃, that is, in circuit with phase winding 91.

In case of an excessive temperature rise in the motor, the single pole thermal switch 49 will be caused to open, causing the motor to operate as a single-phase motor with a greatly increased current value traversing phase winding 91. This excess current causes opening of the breaker 101, whereby both phase windings are fully deenergized. Even if thermal switch 49 does reclose, upon cooling of the motor, neither of the two phase windings will be reenergized, since only one terminal of one phase winding is connected to a source of voltage.

Referring now to Fig. 5 of the drawings, I have there illustrated a housing 13, stator laminations 15 and a polyphase winding 21, together with a rotor 29. I have illustrated also a modified form of the thermal switch 49 which I have indicated by the numeral 95 and which may be of the kind disclosed and claimed in United States Patent No. 1,947,078 to H. E. Cobb. In this form of a thermal switch, the same type of snap-acting disk having contact members associated therewith, a base for supporting the disk and also for supporting cooperating fixed contact members is provided, and the operation of this device is the same as that hereinbefore set forth for thermal switch 49.

If it is not desired to use the construction and location of switch 49 as shown in Fig. 1 of the drawings, the thermal switch 95, as shown in Fig. 5 of the drawings, may be used and be mounted directly on the energizing winding, and it will be obvious that this may result in better protection of the motor because of the fact that the thermal switch 95 is located close to the copper of the motor.

The location of switch 95 in direct heat-receiving relation with the stator energizing windings 21 has the further advantage that there is a smaller temperature differential between the copper and the thermal switch, so that it may be expected that this switch 95 will follow more closely the temperature variations of the energizing or phase windings and thereby better protect the motor against possible excessive temperature rises and burnouts because of relatively large overloads that are continued for too long a period of time.

It will be noted that the method embodying my invention provides one control device which is purely thermally controlled or actuated, while the second control device may be said to be current controlled. It is further obvious that it is not necessary that the current controlled circuit interrupter be located closely adjacent to or inside of the motor frame, since it is not dependent directly upon the temperature rise of the motor, but depends more particularly upon current effects.

The method embodying my invention thus provides means for interrupting one phase circuit of a plurality of such circuits, thereby overloading the other phase circuit or circuits, the increased current traversing such circuits being then operative to cause actuation of a current-controlled circuit-interrupting device.

Various other modifications may be made in the method embodying my invention without departing from the spirit and scope thereof, and I desire, therefore, that only such limitations shall be placed thereon as are imposed by the prior art or are set forth in the appended claims.

I claim as my invention:

1. In combination with a polyphase electric motor comprising a stator and polyphase windings thereon, a switch thermally responsive to a part of said motor for controlling the energization of one of said windings, and a current-controlled switch dependent upon the opening operation of said first-named switch for controlling the energization of the other windings.

2. In combination with a polyphase electric motor comprising a stator and polyphase windings thereon, a switch, responsive to the temperature of a part of said motor, mounted on the stator and controlling the energization of one of said windings, and a plural-pole current-actuated switch dependent upon the opening operation of said first-named switch for controlling the energization of the other windings.

3. In combination with a polyphase electric motor comprising a stator and polyphase windings thereon, a single pole thermally-actuable switch on the stator adapted to open the energizing circuit of one of said polyphase windings when the stator temperature reaches a certain value and a plural-pole current-actuated switch adapted to interrupt the energizing circuit of the other polyphase windings in response to excess current conditions therein.

4. In a motor-protecting system, the combination with an electric motor comprising a polyphase energizing winding, of a thermally-actuable switch responsive to motor temperature and controlling one phase circuit, and a current-actuated switch dependent upon the opening operation of said first-named switch for controlling the other phase circuits.

5. In a motor-protecting system, the combination with an electric motor comprising a polyphase energizing winding, of a single-pole thermal switch located in heat-receiving relation to the motor and controlling one phase circuit, and a plural-pole current-actuated switch dependent upon the opening operation of said first-named switch for controlling the other phase circuits.

6. In a protecting system for an electric motor having a polyphase energizing winding and a plurality of energizing leads connected thereto, a single-pole thermally-actuable switch located in heat-receiving relation to the motor and connected in one only of said energizing leads, a plural-pole current-controlled switch connected in a plurality of energizing leads and means directly thermally associated with the single pole switch to cause the operation thereof in predetermined sequence relatively to the plural-pole switch.

7. In a protecting system for an electric motor having a polyphase energizing winding and a plurality of energizing leads connected thereto, a single pole thermally-actuable switch located in heat-receiving relation to the motor and connected in circuit with one only of the energizing leads, a plural-pole current-controlled switch connected in circuit with a plurality of energizing leads, and a current-traversed heating element in heat-transferring relation to the single-pole switch to cause the operation thereof before the plural-pole switch is operated.

MEIGS W. BARTMESS.